(12) United States Patent
Astrom et al.

(10) Patent No.: US 11,815,587 B2
(45) Date of Patent: Nov. 14, 2023

(54) OBJECT TARGETING

(71) Applicant: Telefonaktiebolaget LM Ericsson (publ), Stockholm (SE)

(72) Inventors: Magnus Astrom, Lund (SE); Bengt Lindoff, Bjarred (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 1032 days.

(21) Appl. No.: 16/325,906

(22) PCT Filed: Dec. 5, 2018

(86) PCT No.: PCT/EP2018/083693
§ 371 (c)(1),
(2) Date: Feb. 15, 2019

(87) PCT Pub. No.: WO2020/114595
PCT Pub. Date: Jun. 11, 2020

(65) Prior Publication Data
US 2021/0333381 A1    Oct. 28, 2021

(51) Int. Cl.
*G01S 13/08* (2006.01)
*G01S 13/86* (2006.01)
(Continued)

(52) U.S. Cl.
CPC ............ *G01S 13/08* (2013.01); *G01S 13/867* (2013.01); *G01S 15/08* (2013.01); *G01S 15/86* (2020.01);
(Continued)

(58) Field of Classification Search
CPC .................................. F41G 3/326; F41G 7/20
See application file for complete search history.

(56) References Cited

U.S. PATENT DOCUMENTS 3,876,308 A * 4/1975 Alpers ...................... F41G 7/30
356/141.5
3,986,682 A * 10/1976 Dryden .................... F41G 7/20
244/3.17
(Continued)

FOREIGN PATENT DOCUMENTS

EP    0481278 A1    4/1992
EP    1480058 A2   11/2004
(Continued)

OTHER PUBLICATIONS

"Advantages of Phased Array Antenna/ Disadvantages of Phased Array Antenna"; no author given; posted at rfwireless-world,com; copyright in the year 2012. (Year: 2012).*
(Continued)

*Primary Examiner* — Bernarr E Gregory
(74) *Attorney, Agent, or Firm* — Leffler Intellectual Property Law, PLLC

(57) ABSTRACT

A method for targeting an object of point-to-point transmission. The method comprises obtaining an image comprising image data and selecting an area of the image wherein the area comprises image data representing the object to be targeted. The method further comprises steering a transmission beam of an antenna array in a direction corresponding to the selected area in response to the selection and transmitting a signal using the steered transmission beam of the antenna array. Corresponding apparatus and computer program product are also disclosed.

28 Claims, 5 Drawing Sheets

(51) Int. Cl.
    *G01S 15/08*     (2006.01)
    *G01S 15/86*     (2020.01)
    *G01S 17/08*     (2006.01)
    *G01S 17/86*     (2020.01)
    *H04B 7/06*     (2006.01)
    *G01S 13/00*     (2006.01)

(52) U.S. Cl.
    CPC .............. *G01S 17/08* (2013.01); *G01S 17/86* (2020.01); *H04B 7/0617* (2013.01)

(56) References Cited

U.S. PATENT DOCUMENTS

| | | | |
|---|---|---|---|
| 4,739,401 A * | 4/1988 | Sacks .................... | F41G 7/2253 348/700 |
| 5,303,878 A * | 4/1994 | McWilliams ......... | F41G 7/2253 382/103 |
| 5,633,705 A | 5/1997 | Asayama | |
| 5,805,109 A * | 9/1998 | Whiting .................. | H01Q 3/22 342/368 |
| 6,142,410 A * | 11/2000 | Naccache ............... | F41G 7/301 244/3.14 |
| 6,347,001 B1 | 2/2002 | Arnold et al. | |
| 6,580,385 B1 | 6/2003 | Winner et al. | |
| 7,358,889 B2 | 4/2008 | Abe et al. | |
| 7,636,452 B2 * | 12/2009 | Kamon .................... | F41G 3/326 348/208.14 |
| 7,756,298 B2 * | 7/2010 | Miyahara .............. | G01S 13/867 382/104 |
| 9,000,340 B2 | 4/2015 | Dicander | |
| 10,082,562 B1 | 9/2018 | Abari et al. | |
| 10,473,778 B2 * | 11/2019 | Tuxen ................... | G01S 13/867 |
| 2008/0191926 A1 * | 8/2008 | Benayahu ............. | G01S 13/867 342/55 |
| 2012/0008832 A1 * | 1/2012 | Wang ..................... | G06V 20/52 382/103 |
| 2013/0324190 A1 * | 12/2013 | Ju ...................... | H04N 5/23245 348/208.4 |
| 2013/0342657 A1 | 12/2013 | Robertson | |
| 2014/0204215 A1 * | 7/2014 | Kriel ..................... | G01S 13/867 342/52 |
| 2015/0237455 A1 * | 8/2015 | Mitra ........................ | H04S 7/30 381/92 |
| 2015/0243017 A1 | 8/2015 | Fujimoto et al. | |
| 2017/0077765 A1 | 3/2017 | Bell et al. | |
| 2017/0323458 A1 | 11/2017 | Lablans | |
| 2018/0067204 A1 * | 3/2018 | Frizzell ................ | G01S 13/867 |
| 2018/0322784 A1 | 11/2018 | Schild | |

FOREIGN PATENT DOCUMENTS

| | | |
|---|---|---|
| EP | 1901225 A1 | 3/2008 |
| JP | 06317741 A | 11/1994 |
| JP | 2002277548 A | 9/2002 |
| JP | 2006215718 A | 8/2006 |
| JP | 2008090796 A | 4/2008 |
| JP | 2012235440 A | 11/2012 |
| JP | 2015190777 A | 11/2015 |
| JP | 2016038840 A | 3/2016 |
| JP | 2016051081 A | 4/2016 |
| WO | 2017039047 A1 | 3/2017 |
| WO | 2018077870 A1 | 5/2018 |

OTHER PUBLICATIONS

J. A. Freking, "Computer Vision Control for Phased Array Beam Steering"; Texas A&M University; College Station, Texas, USA; May 2018. (Year: 2018).*

Mohamed Trabelsi et al., "Improvements of Object Grabbing Method by Using Color Images and Neural Networks Classification", IEEE Industrial Electronics, IECON 2006, Nov. 1, 2006, Piscataway, NJ, USA, pp. 3922-3927.

PCT International Search Report, dated Aug. 27, 2019, in connection with International Application No. PCT/EP2018/083693, all pages.

PCT Written Opinion, dated Aug. 27, 2019, in connection with International Application No. PCT/EP2018/083693, all pages.

Y. Arimoto, "Multi-Gigabit Free-Space Laser Communications Using Compact Optical Terminal with Bidirectional Beacon Tracking", 2011 IEEE International Conference on Communications, Jun. 5-9, 2011, Kyoto, Japan, Piscataway, NJ, USA, pp. 1-5.

Japanese Office Action dated Jun. 21, 2022 in connection with Japanese Application No. 2021-531309, 9 pages.

English language translation of Japanese Office Action dated Jun. 21, 2022 in connection with Japanese Application No. 2021-531309, 8 pages.

* cited by examiner

OBJECT TARGETING

TECHNICAL FIELD

The present disclosure relates generally to the field of distance measurement and point-to-point transmission. More particularly, it relates to targeting an object for distance measurement and point-to-point transmission.

BACKGROUND

A drawback of targeting objects for distance measurements and/or point-to-point transmission is that the targeting may be inaccurate. As a result, the wrong object may be targeted.

Another drawback of targeting objects for distance measurements and/or point-to-point transmission is that continuous distance measurements of the object may result in high radiation levels or power consumption. As a result, continuous distance measurements may be infeasible.

Therefore, there is a need for alternative approaches to targeting an object for distance measurement and/or point-to-point transmission.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a method for targeting an object of point-to-point transmission.

The method comprises obtaining an image comprising image data and selecting an area of the image wherein the area comprises image data representing the object to be targeted.

The method also comprises steering a transmission beam of an antenna array in a direction corresponding to the selected area in response to the selection and transmitting a signal using the steered transmission beam of the antenna array.

In some embodiments, the obtaining of the image is performed by a camera sensor.

In some embodiments, the camera sensor is one of a camera, an infrared camera or a multi-purpose camera or a night vision camera.

In some embodiments, the selected area of the image comprises an illustration of the object to be targeted.

In some embodiments, the selecting of the area of the image is performed by a user via a touch sensitive display.

In some embodiments, the selecting of the area of the image is performed by object recognition software.

In some embodiments, the object recognition software is adapted to recognize one or more of: a communication device, a phone, a tablet, a human being, face of a human being, an animal, contours of an animal, a vehicle, a pedestrian, a device under manufacturing, and an industrial machine.

In some embodiments, the antenna array comprises at least two antenna elements, and wherein the direction is determined by one or more of: a spacing between two of the at least two antenna elements, a signal frequency, a precoding vector, and adjustment of phase and/or amplitude of the signal applied to each of the at least two antenna elements.

In some embodiments, the antenna array comprises a two-dimensional antenna array.

In some embodiments, the direction of the antenna array is determined by a beamforming angle of the antenna array, the location of the targeted object and a focal length of the camera sensor.

In some embodiments, the beamforming angle is dependent on an antenna spacing and an angle that the camera is projecting on the camera sensor.

In some embodiments, at least one beamforming parameter is determined based on coordinates of the selected area of the image.

In some embodiments, the direction is usable both for transmitting and receiving signals.

In some embodiments, the antenna array is comprised in a directable distance sensor.

In some embodiments, the distance sensor is one of a radar sensor or a LIDAR sensor or an ultra sound sensor.

In some embodiments, a duration, starting at the transmitting of the signal and ending when a reflection of the transmitted signal is received, is measured for performing distance measurement.

In some embodiments, a received signal is compared to a template signal for the direction, and wherein performing distance measurement comprises determining a distance to the object based on a residual between the received signal and the template signal.

In some embodiments, the transmitted signal comprises an electromagnetic pulse for measuring a distance to the targeted object.

In some embodiments, the transmitted signal comprises data for transmission to the targeted object.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for targeting an object of point-to-point transmission.

The apparatus comprises controlling circuitry configured to cause obtainment of an image comprising image data and selection of an area of the image, the area comprising image data representing the object to be targeted.

The controlling circuitry is also configured to cause steering of a transmission beam of an antenna array in a direction corresponding to the selected area in response to the selection and transmission of a signal using the steered transmission beam of the antenna array.

A fourth aspect is a transceiver comprising the apparatus of the third aspect.

A fifth aspect is a wireless communication device comprising the apparatus of the third aspect and/or the transceiver of the fourth aspect.

A sixth aspect is a vehicle comprising the apparatus of the third aspect and/or the transceiver of the fourth aspect.

A seventh aspect is a surveillance system comprising the apparatus of the third aspect and/or the transceiver of the fourth aspect.

In some embodiments, any of the above aspects may additionally have features identical with or corresponding to any of the various features as explained above for any of the other aspects.

An advantage of some embodiments is that alternative approaches to targeting an object of point-to-point transmission are provided.

Another advantage of some embodiments is that more accurate and more reliable measurements may be provided.

Yet an advantage of some embodiments is that more accurate and more reliable distance measurements may be provided.

Yet another advantage of some embodiments is that sensor fusion applications in combination with artificial intelligence may be realized.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, a drawback of targeting objects for distance measurements and/or point-to-point transmission is that the targeting may be inaccurate and as a result the wrong object may be targeted.

Another drawback of targeting objects for distance measurements and/or point-to-point transmission is that continuous distance measurements of the object may result in high radiation levels or power consumption and as a result, continuous distance measurements may be infeasible. In the following, embodiments will be described where alternative approaches to targeting an object for distance measurement and/or point-to-point transmission are provided.

Sensor fusion comprises combining of sensory data or data derived from disparate sources such that the resulting information has less uncertainty, i.e. more accurate, more complete or more dependable, than would be possible when these sources were used individually.

Current systems do not include sensor fusion capabilities for targeting a certain object for distance measurement and/or point-to-point transmission, while some embodiments disclosed herein do.

Figure 1:
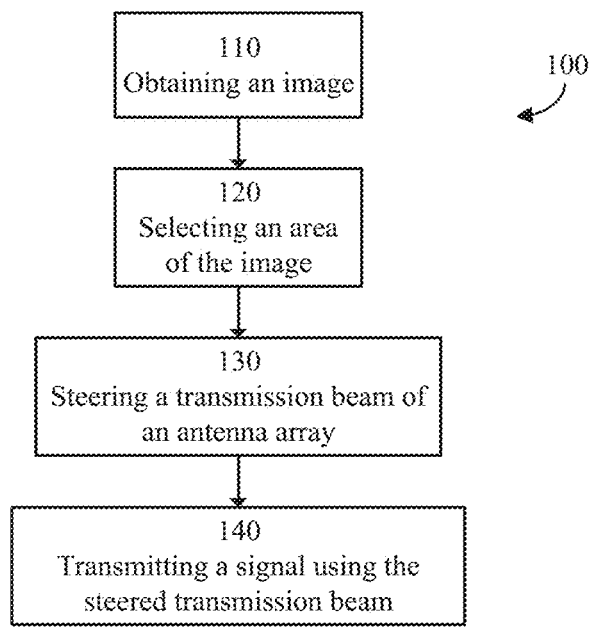
FIG. 1 is a flowchart illustrating example method steps according to some embodiments.

FIG. 1 is a flowchart illustrating method steps of an example object targeting method 100 according to some embodiments. The object targeting method 100 is for targeting an object of point-to-point transmission. Thus, the object targeting method 100 may, for example, be performed by the object targeting apparatus 300 of FIG. 3*a*.

The object targeting method 100 comprises following steps.

In step 110, an image comprising image data is obtained. The obtaining of the image may be performed by a camera sensor, e.g., a camera in a wireless communication device or a camera in a vehicle or a camera in a surveillance system. The camera sensor may be one of a camera (i.e. an optical instrument for recording or capturing images, which may be stored locally, transmitted to another location, or both), an infrared camera (i.e. a camera configured for detecting thermal activity), a multi-purpose camera (i.e. a camera comprising a plurality of different filters configured for different purposes e.g. for capturing subjects in low light conditions and/or in normal light conditions etc.), or a night vision camera. Further, the image may also comprise a combination of images taken by a variety of cameras (or filters) e.g. a combination of an image obtained with a multi-purpose camera (e.g. illustrating a captured subject in low light conditions) with an image obtained with an infrared camera (e.g. illustrating thermal activity of a captured subject).

In step 120, an area of the image is selected. The selected area comprises image data representing the object to be targeted. The selected area of the image may comprise an illustration of the object to be targeted. The selecting of the area of the image may be performed by, e.g., object recognition software or a user. The user may, via a touch sensitive display or via other input means select the area of the image. The object recognition software may be adapted to recognize objects of interest, for example, one or more of a communication device, a phone, a tablet, a human being, face of a human being, an animal, contours of an animal, a vehicle, a pedestrian, a device under manufacturing, and an industrial machine as objects to be targeted for selecting the area of the image.

In some embodiments, the selected area consists of a selected point of the image. The selected point comprises image data representing the object to be targeted. The selected point of the image may be part of an illustration of the object to be targeted. The selecting of the point of the image may be performed by, e.g., object recognition software or a user. The user may, via a touch sensitive display or via other input means select the point of the image. The object recognition software may be adapted to recognize objects of interest, for example, one or more of a communication device, a phone, a tablet, a human being, face of a human being, an animal, contours of an animal, a vehicle, a pedestrian, a device under manufacturing, and an industrial machine as objects to be targeted for selecting the point of the image.

Furthermore, any image processing of the obtained image may be performed in either or both of the apparatus obtaining the image (i.e. in a processing module of the apparatus) and in a cloud service assuming that the apparatus obtaining the image is a connected device, Hence, parts of the image processing may be performed in a server in the cloud service and/or in a node in a cellular network.

In step 130, a transmission beam of an antenna array is steered in a direction corresponding to the selected area (or point) in response to the selection in step 120. The antenna array may be comprised in a directable distance sensor adapted to measure distance, e.g., a radar sensor or a LIDAR sensor or an ultra sound sensor.

The antenna array may in some embodiments be one dimensional and comprise at least two antenna elements. The direction may be determined by one or more of a spacing between two of the at least two antenna elements, a phase shift setting for the respective one of the at least two antenna elements, a signal frequency, a precoding vector, and adjustment of phase and/or amplitude of the signal applied to each of the at least two antenna elements.

The antenna array may in some embodiments be a two-dimensional antenna array.

The direction of the antenna array may be further determined by a beamforming angle of the antenna array, the location of the targeted object and a focal length of the camera sensor.

Moreover, the direction may be determined in both azimuth and elevation angles.

The beamforming angle may be dependent on an antenna spacing and an angle that the camera is projecting on the camera sensor.

At least one of above mentioned beamforming parameters may be determined based on coordinates of the selected area or point of the image. More specifically, the at least one beamforming parameter may be determined based on coordinates of the selected area or point of the image.

In step 140, a signal is transmitted using the steered transmission beam of the antenna array of step 130. The steered transmission beam of the antenna array may be usable both for transmitting and receiving the signal.

In some embodiments, a duration, starting at the transmitting of the signal and ending when a reflection of the transmitted signal is received, is measured for performing distance measurement.

In some embodiments, a received signal is compared to a transmitted (i.e. template) signal for the direction, and wherein performing distance measurement comprises determining a distance to the object based on a time difference between the received signal and the transmitted (i.e. template) signal.

In some embodiments, the transmitted signal comprises an electromagnetic pulse for measuring a distance to the targeted object.

In some embodiments, the transmitted signal comprises data for transmission to the targeted object. The data may be used for setting up a communication link with the targeted object. The data may comprise a broadcast type message or a message which does not require a communication link to be set up, or an acknowledgement to be received.

The targeted object may comprise an object of interest, the interest may comprise a distance measurement or a data communication link to any one of a communication device, a phone, a tablet, a human being, face of a human being, an animal, contours of an animal, a vehicle, a pedestrian, a device under manufacturing, and an industrial machine.

Examples of objects for targeting are a communication device, a phone, a tablet, a human being, face of a human being, an animal, contours of an animal, a vehicle, a pedestrian, a device under manufacturing, and an industrial machine etc.

An advantage of some embodiments is that alternative approaches to targeting an object of point-to-point transmission are provided.

Another advantage of some embodiments is that more accurate and more reliable measurements may be provided Yet an advantage of some embodiments is that more accurate and more reliable distance measurements may be provided.

Yet another advantage of some embodiments is that sensor fusion applications in combination with artificial intelligence may be realized.

Figure 2:
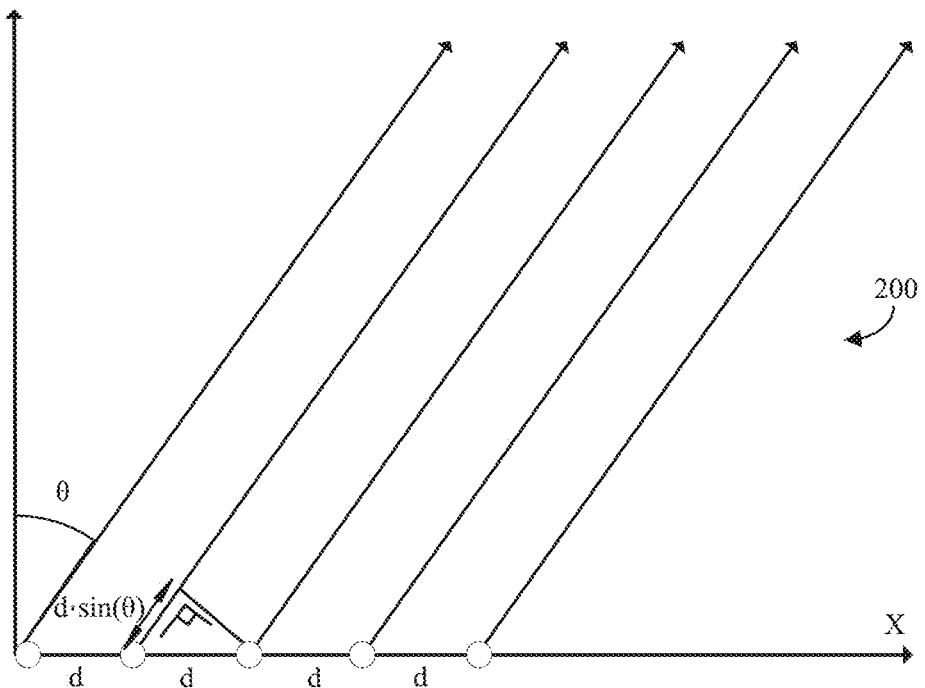
FIG. 2 is a schematic drawing illustrating an example beamforming according to some embodiments.

FIG. 2 is a schematic drawing illustrating example beamforming according to some embodiments. The beamforming 200 is for targeting an object of point-to-point transmission. Thus, the beamforming 200 may, for example, be performed by the apparatus elements 307 (307a,307b,307c,307d) of FIG. 3c.

The beamforming may be achieved using any suitable approaches. General beamforming approaches are well known in the art and will not be elaborated on in detail herein.

By arranging multiple antennae elements in a one-dimensional antenna array or in a two-dimensional antenna array, it is possible to form a transmission beam in the measurement direction, allowing for increased range and accuracy due to elimination of reflections from adjacent objects.

In this kind of antenna arrangement, the distance, d, between two antenna elements and the signal frequency, together with a precoding vector, adjusting phase and/or amplitude of the signal, applied to each antenna element outputs will determine the direction, θ, of the measurements.

The relation between the phase shift between two successive antenna elements, θ, wavelength λ, and beamforming angle φ, may therefore be defined according to following:

$$\theta = \frac{2\pi d}{\lambda}\sin\varphi$$

For example, the 61 GHz ISM band may be used for such applications and allows for highly accurate distance measurements up to distances of tens of meters, however other frequency bands, such as for instance the 26 GHz, 28 GHz or 39 GHz band may also be applicable.

The antenna arrangement may be comprised in a directable distance sensor adapted to measure distance, e.g. a radar sensor or a LIDAR sensor or an ultra sound sensor, wherein the distance sensor may be integrated on a chip.

Figure 3A:
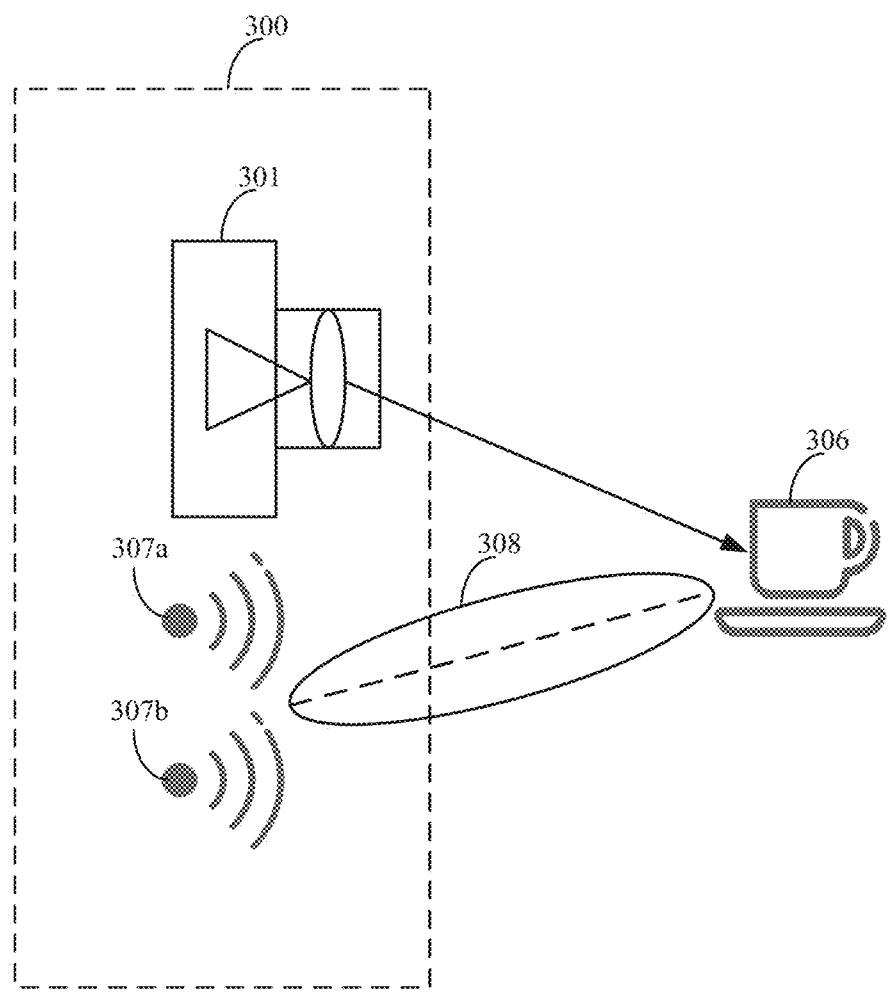
FIG. 3*a* is a schematic drawing illustrating an example apparatus according to some embodiments.

FIG. 3a is a schematic drawing illustrating an example apparatus according to some embodiments. The object targeting method 100 illustrated in FIG. 1 may, for example, be performed by the object targeting apparatus 300 of FIG. 3a.

The object targeting apparatus 300 may be comprised in a mobile communication device such as for example a smartphone. A mobile communication device is an example of a device comprising multiple sensors, e.g., camera, microphone, radio antennae and GPS receivers.

The object targeting device 300 may additionally be equipped with, e.g., radar sensors, allowing accurate measurements over short range, up to a couple of meters. Such radar sensor may or may not be combined with a communication unit such that the combined unit may be used both for short range communications and radar applications, since both may operate in the same frequency range, and are composed of similar building blocks. Hence, mobile communication devices according to the description above typically comprise platforms for sensor fusion applications.

FIG. 3a illustrates the object targeting apparatus 300 comprising a camera sensor 301 configured to obtain an image. The camera sensor 301 may be one of a camera, an infrared camera or a multi-purpose camera or a night vision camera.

FIG. 3a further illustrates the object targeting apparatus 300 further comprising an antenna array comprising at least two antenna elements 307a,307b. The antenna array may in some embodiments comprise a two-dimensional antenna array. The antenna array may be further comprised in a directable distance sensor. The distance sensor may be one of a radar sensor or a LIDAR sensor or an ultra sound sensor.

The object targeting apparatus 300 is configured for targeting an object 306 of point-to-point transmission. The object targeting apparatus 300 device is configured to cause the camera sensor 301 to obtain an image comprising image data. The object targeting apparatus 300 is further configured to acquire a selection of an area of the image comprising image data representing the object 306 to be targeted. The selection may be acquired via object recognition software or a user.

The object targeting apparatus 300 is also configured to cause the antenna array comprising the at least two antenna elements 307a, 307b, which may be comprised in a directable distance sensor, to steer a transmission beam 308 of the antenna array in a direction corresponding to the selected area of the obtained image in response to the selection. The object targeting device 300 is moreover configured to transmit a signal using the steered transmission beam of the antenna array towards the targeted object 306.

Figure 3B:
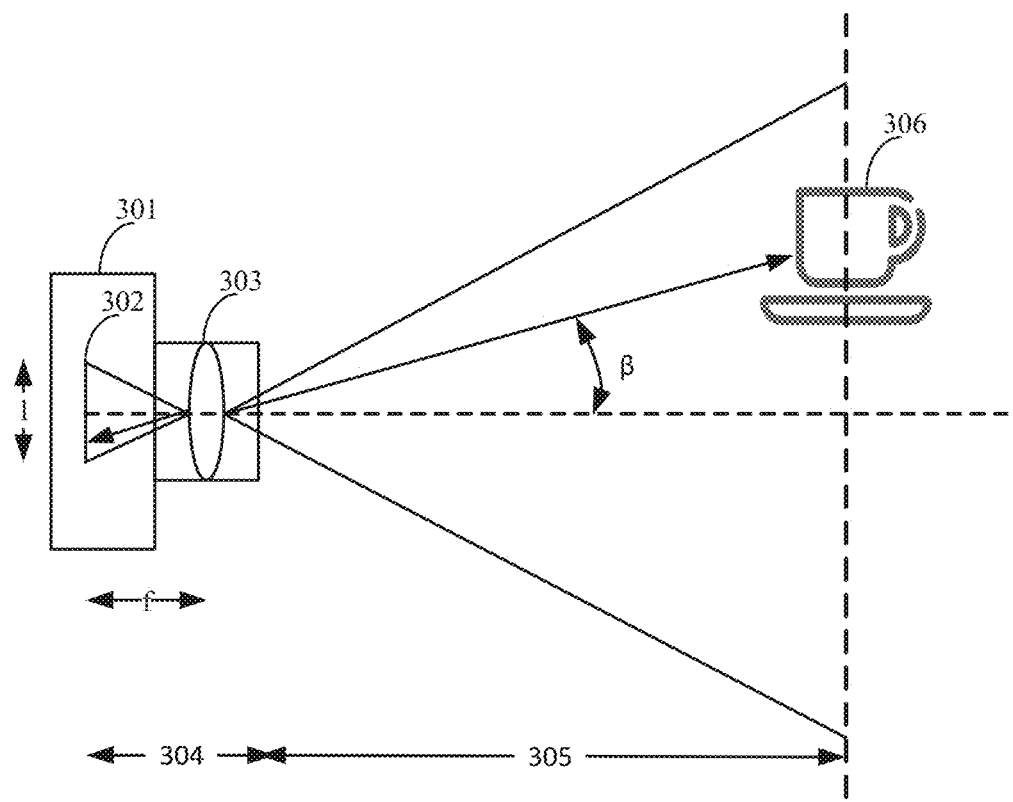
FIG. 3*b* is a schematic drawing illustrating an example apparatus according to some embodiments.

FIG. 3b is a schematic drawing illustrating an example apparatus according to some embodiments. The object targeting method 100 illustrated in FIG. 1 may partly, for example, be performed by the camera sensor 301 of FIG. 3b.

FIG. 3b illustrates a focal length f of a camera sensor 301. The focal length f, usually represented in millimetres (mm), is a basic description of a photographic lens 303. It is a calculation of an image distance 304 from the lens 303 to a point where light rays converge to form a sharp image of an object to a sensor at the focal plane 302 in the camera sensor 301. The focal length f of a lens 303 is determined when the lens 303 is focused at infinity. Together with the sensor size I, the focal length f defines the angle of view i.e. how much of the scene will be captured, the magnification, how large individual elements will be etc. The longer the focal length f, the narrower the angle of view and the higher the magnification for a given sensor size I. The shorter the focal length f, the wider the angle of view and the lower the magnification. Hence, based on the two parameters, it is possible to determine the real world angle β of an object in the image compared to the centre of the image.

FIG. 3b further illustrates the relation between the focal length f of the camera sensor 301, the location of the image object 306 and an object distance 305.

Figure 3C:
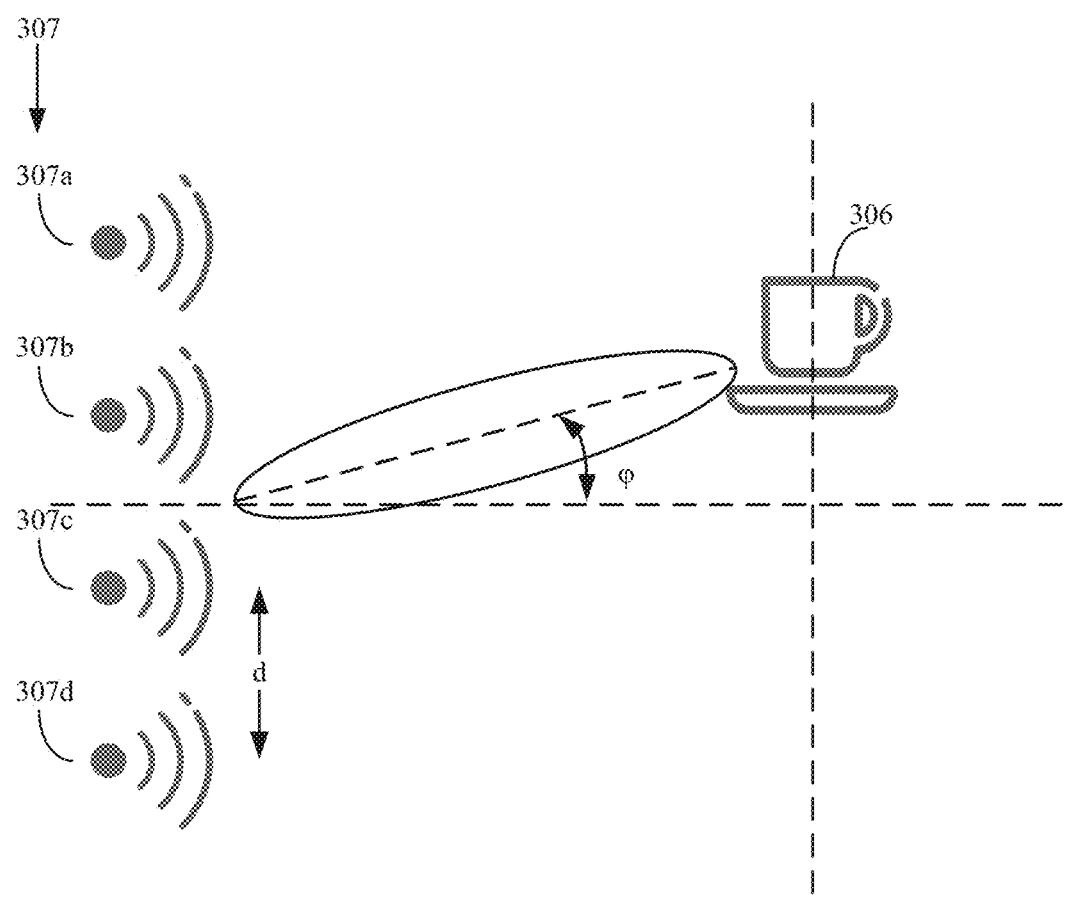
FIG. 3*c* is a schematic drawing illustrating an example apparatus according to some embodiments.

FIG. 3c is a schematic drawing illustrating an example apparatus according to some embodiments. The object targeting method 100 illustrated in FIG. 1 may partly, for example, be performed by the object targeting apparatus 300 of FIG. 3c.

FIG. 3c illustrates an antenna array 307 comprising four antenna elements 307a,307b,307c,307d which may be comprised in a directable distance sensor, to steer a transmission beam of the antenna array in a direction of the targeted object 306. The antenna array 307 is configured to transmit a signal using the steered transmission beam of the antenna array towards the targeted object 306.

FIG. 3c further illustrates a relation between the antenna array beamforming angle φ depending on an antenna element spacing d i.e. a distance between two antenna elements in an antenna array. Hence, it is d/λ that will determine the beamforming angle φ, i.e. d in relation to the wavelength.

The beamforming angle φ may therefore be defined according to following:

$$\varphi = \sin^{-1}\frac{\theta\lambda}{2\pi d}$$

This is valid for a phased array antenna, i.e., an antenna with maximum output power for each antenna element, and wherein only the phase differs between the antenna elements thus achieving a maximum output power in the desired direction. Other precoder designs, e.g., based on filter design theory, may also be used, resulting in transmission lobes with different properties, e.g., a weaker and/or a more narrow lobe.

FIGS. 3a,3b,3c combined illustrate a relation between camera focal length, f, object image location and antenna array beamforming angle, φ, as depending on antenna element distance d and angle that the camera is projecting on the camera sensor.

In some embodiments, the object targeting apparatus 300 of FIG. 3a is comprised in a wireless (e.g. mobile) communication device and/or a transceiver configured to perform the, for example, the method steps of the object targeting method 100.

The wireless communication device may comprise multiple sensors e.g. camera sensor and radio antennae adapted for sensor fusion.

The wireless communication device may also be configured for Bluetooth communication i.e. point-to-point communication, WiFi communication according to IEEE 802.11 and also Cellular device-to-device (D2D), and wherein the targeted object may respond to the transmitted signal.

In some embodiments, the object targeting apparatus 300 of FIG. 3a is comprised in a vehicle and/or a transceiver configured to perform, for example, the method steps of the object targeting method 100.

The vehicle may comprise multiple sensors e.g. camera sensor and radio antennae adapted for sensor fusion.

The vehicle may also comprise a camera system adapted to zoom in and measure distance to objects in the distance.

In some embodiments, the object targeting apparatus 300 of FIG. 3a is comprised in a surveillance system and/or a transceiver configured to perform, for example, the method steps of the object targeting method 100.

The surveillance system may comprise multiple sensors e.g. camera sensor and radio antenna array adapted for sensor fusion.

The surveillance system (e.g. video) may also comprise a control device adapted to control a camera located at a remote location and wherein image processing is performed in a cloud service. Hence, parts of the image processing may be performed in a server in the cloud service and/or in a node in a cellular network.

Figure 4:
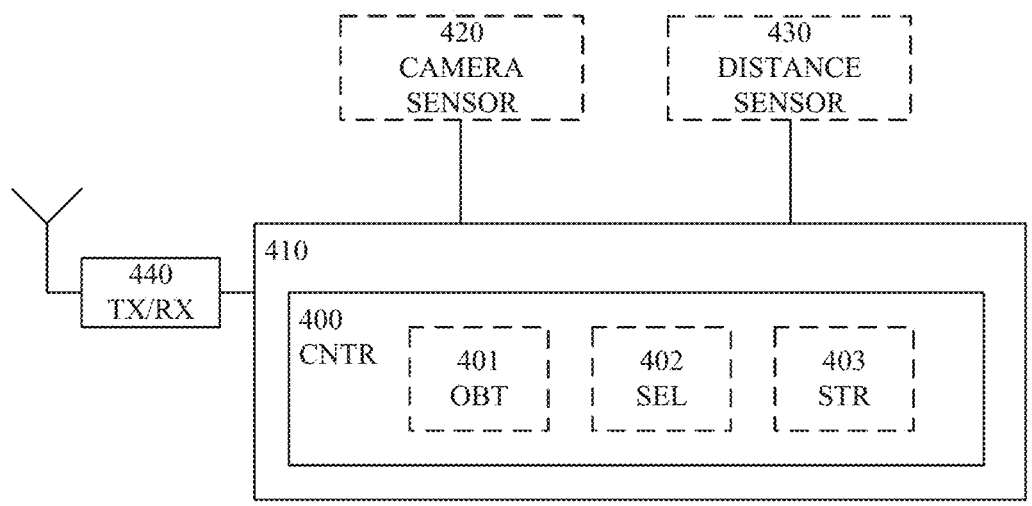
FIG. 4 is a schematic block diagram illustrating an example arrangement according to some embodiments.

FIG. 4 is a schematic block diagram illustrating an example arrangement according to some embodiments. The example arrangement is an object targeting arrangement 410 for targeting an object of point-to-point transmission, wherein the arrangement is configured to be associated with (e.g. operatively connectable, or connected, to) camera sensor arrangement CAMERA SENSOR 420, e.g. camera sensor circuitry, configured to obtain images, and a distance sensor arrangement DISTANCE SENSOR 430, e.g. distance sensor circuitry, configured to measure distance.

The object targeting arrangement 410 comprises controlling circuitry (CNTR) 400, which may in turn comprise an image obtaining arrangement OBT 401, e.g. image obtaining circuitry, configured to obtain an image comprising image data, a selection arrangement SEL 402, e.g. selecting circuitry, configured to select an area of the image wherein the area comprises image data representing the object to be targeted, and a steering arrangement STR 403, e.g. steering circuitry, configured to steer a transmission beam of an antenna array in a direction corresponding to the selected area in response to the selection. A transmission arrangement (not shown), e.g. transmission circuitry, configured to transmit a signal using the steered transmission beam of the antenna array may be comprised in the transceiver 440.

The object targeting arrangement 410 may be comprised in the apparatus 300 described in connection with FIG. 3a and/or the object targeting arrangement 410 may be configured to perform method steps of any of the methods described in connection with FIG. 1 or otherwise described herein.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a vehicle or a surveillance system.

Embodiments may appear within an electronic apparatus (such as a wireless communication device or a vehicle or a surveillance system) comprising arrangements, circuitry, and/or logic according to any of the embodiments described herein. Alternatively or additionally, an electronic apparatus (such as a wireless communication device or a vehicle or a surveillance system) may be configured to perform methods according to any of the embodiments described herein.

Figure 5:
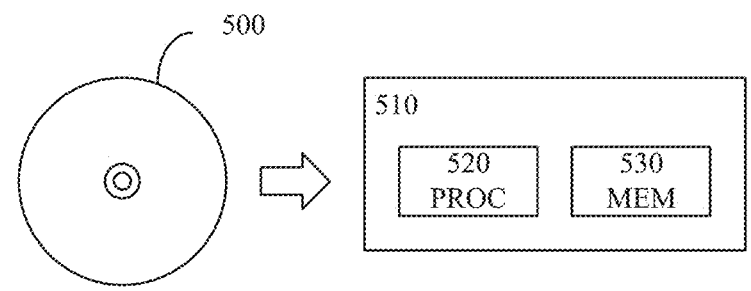
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device or vehicle or a surveillance system 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for targeting an object of point-to-point transmission, the method comprising the steps of:
   obtaining an image,
   selecting an area of the image, the area comprising an image of the object to be targeted,
   steering a transmission beam of an antenna array in a direction corresponding to the selected area in response to the selection,
   transmitting a signal using the steered transmission beam of the antenna array, and
   performing a distance measurement,
   wherein a received signal is compared to a template signal for the direction, and
   wherein performing the distance measurement comprises determining a distance to the object based on a residual between the received signal and the template signal.

2. The method according to claim 1, wherein obtaining the image is performed by a camera sensor.

3. The method according to claim 2, wherein the camera sensor is one of a camera, an infrared camera, a multi-purpose camera, and a night vision camera.

4. The method according to claim 1, wherein the selecting of the area of the image is performed by a user via a touch sensitive display.

5. The method according to claim 1, wherein the selecting of the area of the image is performed by object recognition software.

6. The method according to claim 5, wherein the object recognition software is adapted to recognize one or more of: a communication device, a phone, a tablet, a human being, face of a human being, an animal, contours of an animal, a vehicle, a pedestrian, a device under manufacturing, and an industrial machine.

7. The method according to claim 1, wherein the antenna array comprises at least two antenna elements, and wherein the direction is determined by one or more of: a spacing between two of the at least two antenna elements, a signal frequency, a precoding vector, and adjustment of phase and/or amplitude of the signal applied to each of the at least two antenna elements.

8. The method according to claim 1, wherein the antenna array comprises a two-dimensional antenna array.

9. The method according to claim 1, wherein the direction of the antenna array is determined by a beamforming angle of the antenna array, the location of the targeted object and a focal length of the camera sensor.

10. The method according to claim 9, wherein the beamforming angle is dependent on an antenna spacing and an angle that the camera is projecting on the camera sensor.

11. The method according to claim 1, wherein at least one beamforming parameter is determined based on coordinates of the selected area of the image.

12. The method according to claim 1, wherein the direction is usable both for transmitting and receiving signals.

13. The method according to claim 1, wherein the antenna array is comprised in a directable distance sensor.

14. The method according to claim 13, wherein the directable distance sensor further comprises one of a radar sensor or a LIDAR sensor or an ultrasound sensor.

15. The method according to claim 1, wherein a duration, starting at the transmitting of the signal and ending when a reflection of the transmitted signal is received, is measured for performing distance measurement.

16. The method according to claim 1, wherein the transmitted signal comprises an electromagnetic pulse for measuring a distance to the targeted object.

17. The method according to claim 1, wherein the transmitted signal comprises data for transmission to the targeted object.

18. A non-transitory computer readable medium, having thereon a computer program comprising program instructions, the computer program being loadable into a data processing unit and configured to cause execution of a method for targeting an object of point-to-point transmission when the computer program is run by the data processing unit, wherein the method comprises:
 obtaining an image,
 selecting an area of the image, the area comprising an image of the object to be targeted,
 steering a transmission beam of an antenna array in a direction corresponding to the selected area in response to the selection,
 transmitting a signal using the steered transmission beam of the antenna array, and
 performing a distance measurement,
 wherein a received signal is compared to a template signal for the direction, and
 wherein performing the distance measurement comprises determining a distance to the object based on a residual between the received signal and the template signal.

19. An apparatus for targeting an object of point-to-point transmission, the apparatus comprising controlling circuitry configured to cause:
 acquisition of an image,
 selection of an area of the image, the area comprising an image of the object to be targeted,
 steering of a transmission beam of an antenna array in a direction corresponding to the selected area in response to the selection,
 transmission of a signal using the steered transmission beam of the antenna array, and
 performance of a distance measurement,
 wherein a received signal is compared to a template signal for the direction, and
 wherein performance of the distance measurement comprises determining a distance to the object based on a residual between the received signal and the template signal.

20. The apparatus according to claim 19, wherein the image is obtained by a camera sensor.

21. The apparatus according to claim 19, wherein the camera sensor is one of a camera, an infrared camera or a multi-purpose camera or a night vision camera.

22. The apparatus according to claim 19, wherein the antenna array comprises a two-dimensional antenna array.

23. The apparatus according to claim 19, wherein the antenna array is comprised in a directable distance sensor.

24. The apparatus according to claim 19, further comprising a distance sensor, wherein the distance sensor is one of a radar sensor or a LIDAR sensor or an ultrasound sensor.

25. A transceiver comprising the apparatus of claim 19.

26. A wireless communication device comprising the apparatus of claim 19.

27. A vehicle comprising the apparatus of claim 19.

28. A surveillance system comprising the apparatus of claim 19.

* * * * *